US012803726B2

(12) United States Patent
Marescaux

(10) Patent No.: US 12,803,726 B2
(45) Date of Patent: Nov. 17, 2026

(54) SYSTEMS AND METHODS FOR CARRIER AGGREGATION-BASED BASE STATION BAND RESOURCE MANAGEMENT

(71) Applicant: T-MOBILE INNOVATIONS LLC, Overland Park, KS (US)

(72) Inventor: Matthieu Albert Raoul Marescaux, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 367 days.

(21) Appl. No.: 18/462,879

(22) Filed: Sep. 7, 2023

(65) Prior Publication Data

US 2025/0088319 A1 Mar. 13, 2025

(51) Int. Cl.
*H04L 5/00* (2006.01)
*H04W 72/0453* (2023.01)
(Continued)

(52) U.S. Cl.
CPC ......... *H04L 5/001* (2013.01); *H04W 72/0453* (2013.01); *H04W 72/51* (2023.01); *H04W 72/542* (2023.01)

(58) Field of Classification Search
None
See application file for complete search history.

(56) References Cited

U.S. PATENT DOCUMENTS

2012/0172083 A1* 7/2012 Logalbo .............. H04W 36/144 455/525
2013/0322370 A1* 12/2013 Fong ..................... H04W 72/51 370/329

(Continued)

FOREIGN PATENT DOCUMENTS

WO WO-2010074235 A1 * 7/2010 ........... H04L 5/0007
WO WO-2021190270 A1 * 9/2021 ........ H04M 1/72469
WO WO-2024070472 A1 * 4/2024 ............. H04L 5/001

OTHER PUBLICATIONS

ETSI TS 136 101 V13.4.0 (Sep. 2016) (Year: 2016).*

(Continued)

*Primary Examiner* — Jay L Vogel
(74) *Attorney, Agent, or Firm* — Shook, Hardy & Bacon L.L.P.

(57) ABSTRACT

Systems and methods for carrier aggregation-based base station band resource management are provided. Embodiments provide for, among other things, solutions that address the problem of underutilization of small bandwidth channel layers determining when a UE can be permitted to camp on a small bandwidth channel layer based at least on the UE's carrier aggregation capabilities. When carrier aggregation capability information indicates that the UE supports uplink carrier aggregation, the UE can be controlled to use the small bandwidth channel layer as the primary serving cell. When carrier aggregation capability information indicates that the UE does not support uplink carrier aggregation, the UE can be controlled to use another band layer as the primary serving cell. Configuration and/or reconfiguration of the UE with respect to which cell of the base station it uses for the PCell is based on SIB cell priority parameters that may be provided to the UE.

20 Claims, 6 Drawing Sheets

(51) Int. Cl.
*H04W 72/51* (2023.01)
*H04W 72/542* (2023.01)

(56) References Cited

U.S. PATENT DOCUMENTS

| | | | | |
|---|---|---|---|---|
| 2014/0200001 | A1* | 7/2014 | Song | H04W 8/02 455/436 |
| 2017/0135070 | A1* | 5/2017 | Huber | H04L 5/0041 |
| 2018/0152944 | A1* | 5/2018 | Kumar | H04W 24/10 |
| 2020/0245389 | A1* | 7/2020 | Mok | H04W 4/40 |
| 2020/0367289 | A1 | 11/2020 | Choi et al. | |
| 2022/0217595 | A1* | 7/2022 | Kwok | H04W 36/22 |

OTHER PUBLICATIONS

"5G Carrier Aggregation explained", Nokia, Retrieved from Internet URL : https://www.nokia.com/about-us/newsroom/articles/5g-carrier-aggregation-explained/, accessed on Jul. 30, 2023, p. 8.

"Carrier Aggregation in 5G", Ericsson, Retrieved from Internet URL : https://www.ericsson.com/en/ran/carrier-aggregation, accessed on Jul. 30, 2023, p. 13.

Alleven, M., "AT&T dials up 5G SA uplink 2-carrier aggregation", Fierce Wireless, pp. 1-3 (Apr. 18, 2023).

"How LTE Stuff Works?", 5G NR: System Information, Retrieved from Internet URL : howltestuffworks.blogspot.com/2019/10/5g-nr-system-information.html, accessed on Aug. 6, 2023, p. 9.

"T-Mobile Claims an Uplink Carrier Aggregation "First": How It Differs From What AT&T Announced", Network, Retrieved from Internet URL : https://www.telecompetitor.com/t-mobile-claims-an-uplink-carrier-aggregation-first-how-it-differs-from-what-att-announced/, accessed on Jul. 30, 2023, p. 5 (2023).

"T Mobile Supercharges 5G Standalone Uplink Speeds with Carrier Aggregation First", T Mobile Newsroom, Network, Retrieved from Internet URL : https://www.t-mobile.com/news/network/t-mobile-supercharges-5g-standalone-uplink-speeds-with-carrier-aggregation-first, May 4, 2023, accessed on Jul. 30, 2023, p. 6 (2023).

* cited by examiner

SYSTEMS AND METHODS FOR CARRIER AGGREGATION-BASED BASE STATION BAND RESOURCE MANAGEMENT

BACKGROUND

Carrier Aggregation (CA) is a wireless telecommunications technology that enables a cellular base station to combine distinct carrier channels from a primary serving cell (PCell) band layer and at least one secondary serving cell (SCell) band layer into a single data channel to obtain higher data rates with mobile user equipment (UE). The use of carrier aggregation improves data rates for UE by increasing the overall bandwidth of the logical channel available to the UE to communicate with the operator core network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Small bandwidth channel layers can pose certain challenges to network operators with respect to fully utilizing band layer resources available at a base station. Carrier aggregation (CA) is a technology that enables a cellular base station to combine distinct carrier channels from a primary serving cell (PCell) and at least one secondary serving cell (SCell) into a single logical data channel to obtain higher data rates with mobile user equipment (UE).

One or more of the embodiments of the present disclosure provide for, among other things, solutions that address the problem of underutilization of small bandwidth channel layers by implementing a function that determines when a UE can be permitted to camp on a small bandwidth channel layer based at least on the UE's carrier aggregation capabilities. In some embodiments, the base station may receive a capabilities report indicating a UE's ability to implement downlink and/or uplink carrier aggregation, and indicating which frequency bands the UE is capable of using for downlink and/or uplink carrier aggregation. Based on that configuration report, a small channel utilization manager may determine whether the UE can be reconfigured to use an available small bandwidth channel layer as its PCell and camp on that layer, thus increasing the utilization of that small bandwidth channel layer. In some embodiments, configuration and/or reconfiguration of the UE with respect to which cell of the base station it uses for the PCell is based on SIB cell priority parameters that may be provided to the UE.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
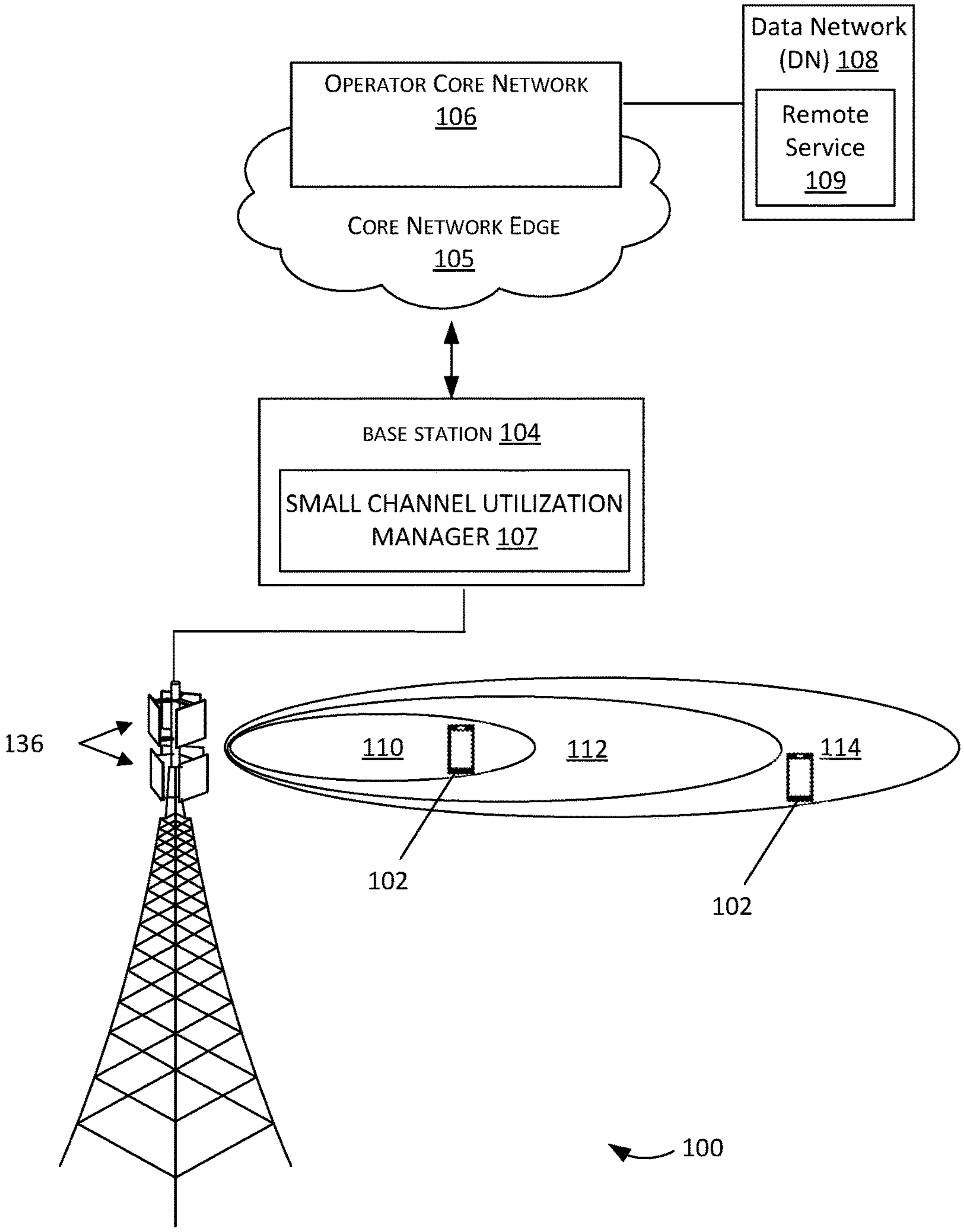
FIG. 1 is a diagram illustrating an example network environment, in accordance with some embodiments described herein.

In the following detailed description, reference is made to the accompanying drawings that form a part hereof, and in which is shown specific illustrative example embodiments in which the embodiments may be practiced. These embodiments are described in sufficient detail to enable those skilled in the art to practice the embodiments, and it is to be understood that other embodiments may be utilized, and that logical, mechanical, and electrical changes may be made without departing from the scope of the present disclosure. The following detailed description is, therefore, not to be taken in a limiting sense.

While a network operator may have a license to use a frequency band across a geographic region, the size of the spectrum of frequency available to the network operator within that frequency band may vary from location to location within that geographic region. For example, a network operator may have a license to use the 2500 MHz 5G band N41 (2496 MHZ to 2690 MHz) to provide services to cellular user equipment (UE) that can access 5G band N41, but the actual bandwidth of the channel that the network operator can provide at different base station locations is not uniform from base station to base station. The network operator may have enough of a spectrum of bandwidth in band B41 to be able to operate a base station that provides a 100 MHz channel using time-division duplex (TDD) at one location, but only have enough of a spectrum of bandwidth in band B41 to be able to operate a base station that provides a small 20 or 40 MHz TDD channel at another location.

Small bandwidth channel layers can pose certain challenges to network operators with respect to fully utilizing band layer resources available at a base station. As used herein, a small bandwidth channel layer refers to a TDD band layer having a channel bandwidth of less than 60 MHz, or a frequency-division duplex (FDD) band layer having a channel bandwidth of 5 MHz or less. In particular, unless carrier aggregation is available, assigning a small bandwidth channel layer to a UE to camp on as its primary serving cell (PCell) can result in a degraded user experience because of the limited data throughput in uplink available. For example, a TDD small bandwidth channel layer may proportion its frame in the time domain to dedicate 70% for downlink transmissions and 20% for uplink transmissions (with 10% a guard between downlink and uplink transmissions). If the UE generates substantial uplink transmissions (e.g., from uploading a streaming video feed) and does not support uplink carrier aggregation, the limited uplink bandwidth (and therefore throughput) available on the small bandwidth channel layer may result in lower data rates, dropped data packets, increased latency, and/or other undesired conditions.

Carrier aggregation (CA) is a technology that enables a cellular base station to combine distinct carrier channels from a primary serving cell (PCell) and at least one secondary serving cell (SCell) into a single logical data channel to obtain higher data rates with mobile user equipment (UE). The use of carrier aggregation improves data rates for UE by increasing the overall bandwidth of the logical channel available to the UE to send and/or receive data to the operator core network. In general, for a UE to benefit from carrier aggregation, the UE needs to be located within an overlapped area of coverage from a PCell operating via a primary component carrier, and an SCell operating via a second component carrier. The primary component carrier and second component carrier can either be within the same frequency band (e.g., both carriers in band N41) or within different frequency bands (e.g., one carrier in band N41 and the other in band N71). It should also be understood that a primary component carrier and secondary component carrier can both implement the same duplexing scheme (e.g., both frequency-division duplexing (FDD) or both time-division duplexing (TDD)) or different duplexing schemes (e.g., one TDD and the other FDD).

When a base station establishes a cell that uses a small bandwidth channel layer but does not permit UE to camp on that layer as their PCell, then that cell is consequently only ever used by UE in the capacity of an SCell. This represents a substantial underutilization of that bandwidth resource. That is, an SCell is activated for a UE when the current data channel from the PCell alone does provide sufficient bandwidth to support data transport between the UE and the base station that satisfies one or more quality of service thresholds. Once the need for the extra bandwidth subsides, the SCell is deactivated for that UE. Accordingly, a band layer that is only used by UE as an SCell may remain largely underutilized by UE for extended durations of time.

One or more of the embodiments of the present disclosure provide for, among other things, solutions that address the problem of underutilization of small bandwidth channel layers by implementing at the base station a function that determines when a UE can be permitted to camp on a small bandwidth channel layer based at least on the UE's carrier aggregation capabilities. In some embodiments, the base station may receive a capabilities report indicating a UE's ability to implement downlink and uplink carrier aggregation, and indicating which frequency bands the UE is capable of using for downlink and uplink carrier aggregation. Note that at least with respect to 5G 3GPP standards, uplink carriers available for uplink carrier aggregation (when the UE is capable of uplink carrier aggregation) are a subset of downlink carriers indicated as available for downlink carrier aggregation. Based on that configuration report, a small channel utilization manager may determine whether the UE can be reconfigured to use an available small bandwidth channel layer as its PCell and camp on that layer, thus increasing the utilization of that small bandwidth channel layer. In making this determination, the spectrum management function may first consider the downlink and uplink carrier aggregation capabilities of the UE. For example, if the UE is capable of downlink carrier aggregation, but not uplink carrier aggregation, then that UE is maintained in a configuration that does not permit it to camp on the small bandwidth channel layer. If the UE is capable of downlink carrier aggregation and uplink carrier aggregation, and also supports operating on the frequency band of the small bandwidth channel layer as a PCell and the frequency band of at least one other cell of the base station as an SCell, then the UE may be permitted, and reconfigured, by the small channel utilization manager to connect to and camp on the small bandwidth channel layer.

In some embodiments, the effective range of a UE from the base station may represent an additional factor in determining if the UE may be reconfigured to use the small bandwidth channel layer as a PCell. Because of the power resources available to a base station relative to those of a UE, downlink signals transmitted from a base station tend to propagate farther than uplink signals transmitted from a UE. In addition to distance, the effective range of a UE from the base station may also be influenced by other factors that contribute to signal attenuation, such as building walls, tunnels, terrain (e.g., flat terrain versus rolling hills), and/or natural foliage (e.g., trees) between the UE and the base station. As such, in some embodiments, the small channel utilization manager may determine (e.g., based on signal level) whether the UE is located sufficiently close in range to the base station to have sufficient signal strength to transport both uplink and downlink traffic on the small bandwidth channel layer. If so, then the small channel utilization manager may proceed with reconfiguring the UE to use the small bandwidth channel layer as a PCell. If the UE is not located sufficiently close in range to the base station to have sufficient signal strength to transport both uplink and downlink traffic on the small bandwidth channel layer, then the configuration of the UE may be maintained such that it does not use the small bandwidth channel layer as a PCell.

In some embodiments, configuration and/or reconfiguration of the UE with respect to which cell of the base station it uses for the PCell is based on the System Information Block (SIB) cell priority parameters that may be provided to the UE. SIB cell priority, which may also be referred to as cell selection priority, established at the UE an absolute cell selection preference priority for each of the cells of the base station based on the frequency band associated with a respective cell. For each cell, the SIB cell priority assigned to the cell may take a value from 0 (meaning lowest priority) to a value of 7 (meaning highest priority), and may further include a sub-priority value from 0 (lowest sub-priority) to 8 (highest sub-priority). Note that by convention, sub-priority values are designated using even numbers. Accordingly, a cell having an SIB cell priority of 7.6 (priority 7, sub-priority 6) would have a higher priority than a cell having an SIB cell priority of 7.2 (priority 7, sub-priority 2), which would have a higher priority than a cell having an SIB cell priority of 3.0 (priority 3, sub-priority 0). In this way, the SIB cell priority is a hierarchy of cell priorities that indicate where a UE in idle mode should prefer to camp (and correspondingly, its PCell).

In one or more embodiments of this disclosure, a UE when first initiating registration with a base station utilizes an initial SIB cell priority list (either preconfigured in the UE or provided via an SIB message received from the base station) that ranks cells having a small bandwidth channel layer lower in priority than at least one other cell that does not have a small bandwidth channel layer. The UE will thus proceed through its initial connection with the base stations selecting the higher priority cell, that does not have a small bandwidth channel layer, to camp on. Before the UE is permitted to establish active sessions (e.g., voice calls and/or data transfers), the base station will query the UE by sending a capabilities request message asking the UE to report its capabilities. The UE responds by sending the base station a capabilities report. The capabilities report may include one or more parameters, settings, or other information that the base station uses to configure uplink and downlink radio frequency (RF) data channels for that UE accordingly. The capabilities report also returns information indicating the capabilities of the UE with respect to carrier aggregation, including the UE's ability to implement downlink and/or uplink carrier aggregation and which frequency bands the UE is capable of using for downlink and/or uplink carrier aggregation. In embodiments, the small channel utilization manager processes the capabilities report to determine whether to reconfigure the UE's CIP cell priority list to increase the priority of the cell with the small bandwidth channel layer to the highest priority so that the UE then may use the cell with the small bandwidth channel layer as its preference as a PCell for camping on the base station.

In some embodiments, the small channel utilization manager for the base station may control PCell to SCell relationships for each UE via a base station Media Access Control (MAC) layer. As discussed below, the Media Access Control (MAC) comprises the layer of the base station protocol stack that manages activation and deactivation of secondary serving cells and other aspects of carrier aggregation. In some embodiments, the small channel utilization manager may be implemented within a separate network node or server distinct from the base station (such as a 3$^{rd}$ party server, for example). In such embodiments, the small channel utilization manager implemented on the network node may communicate carrier aggregation reconfiguration to the MAC layer of the base station.

With the embodiments presented herein, the telecommunications network and the network operator benefit from more efficiently utilizing the bandwidth resources of the base station to serve UE, and potentially increasing the number of UEs that may use the base station at a given time. UE can take advantage of available communication links and bandwidth from the small bandwidth channel layer more efficiently, having the desirable consequence of reducing buffer loading and latency at both base stations and UEs. Moreover, technical benefits are realized with respect to network planning because network operators can plan for more optimal utilization of carrier aggregation by accounting for the ability for at least some UEs to camp on the cell with a small bandwidth channel layer.

As shown in FIG. 1, network environment 100 comprises an operator core network 106 that provides one or more wireless network services to one or more UEs 102 via a wireless communication base station 104, often referred to as a radio access network (RAN). In the context of fourth generation (4G) Longer Term Evolution (LTE), a base station 104 may be referred to as an eNodeB, or eNB. In the context of fifth generation (5G) New Radio (NR), the base station 104 may be referred to as a gNodeB, or gNB. Other terminology may also be used, depending on the specific implementation technology (e.g., 6G). In particular, each UE 102 communicates with the operator core network 106 via the base station 104 over one or both of uplink (UL) radio frequency (RF) signals and downlink (DL) RF signals. The base station 104 may be coupled to the operator core network 106 by a backhaul network 105 (which may include and/or be referred to as the core network edge 105) that comprises wired and/or wireless network connections and may include wireless relays and/or repeaters. In some embodiments, the base station 104 is coupled to the operator core network 106 at least in part by the Internet or other public network infrastructure. The network environment 100 is configured for wirelessly connecting UEs 102 to other UEs 102 via the same base station 104, via other base stations, or via other telecommunication networks, such as network 105 or a public switched telecommunication network (PSTN), for example. Generally, each UE 102 is a device capable of unidirectional or bidirectional communication with radio units (also often referred to as radio points or wireless access points) of the base station 104 using RF waves.

As illustrated in FIG. 1, the base station 104 radiates and receives RF signals via one or more directional antennas 136 that serve UE 102 located within a geographic area referred to as a cell or sector. The specific size, shape, and orientation of a cell is a function, at least in part, on the design and azimuth and tilt of the antenna(s) 136 and the carrier frequency and power of the carrier serving that cell. In the particular embodiment illustrated in FIG. 1, base station 104 forms three cells 110, 112, and 114 via the one or more antennas 136. The antenna(s) 136 may be mounted to a site tower 137, as in the example of FIG. 1, or mounted to other structures, such as, but not limited to, exterior walls of a building. In other embodiments, a few or greater number of cells may be formed.

Cells 110, 112, and 114 operate within designated frequency bands, also referred to herein as band layers. For example, the base station 104 may provide connectivity to the UE 102 through a first cell 110 using band layer A, a second cell 112 using band layer B, and a third cell 114 using band layer C. For purposes of this example, band layer A may implement a 5G TDD cell using band N41 at a carrier frequency $f_1$, band layer B may implement a 5G FDD cell using band N25 at a carrier frequency $f_2$ (for downlink) and carrier frequency $f_3$ (for uplink), and band layer C may implement a 5G FDD cell using band N71 at a carrier frequency $f_4$ (for downlink) and carrier frequency $f_5$ (for uplink). In other embodiments and implementations, other combinations and/or numbers of frequency bands may be used at a given base station. In some embodiments, band layer C may comprise a low-band cell, whereas cells 110 and/or 112 are high- or mid-band layers so that cell 110 covers a relatively smaller geographic area than cells 112 and 114, and cell 112 covers a relatively smaller geographic area than cell 114. Moreover, band layer A may be implemented as a small bandwidth channel layer, which in this disclosure refers to a TDD band having a channel bandwidth of less than 60 MHz, or an FDD band having a channel bandwidth of 5 MHz or less. As such, the channel of cell 110 provides less throughput with respect to transporting UE traffic than the channels of cells 112 and 114.

In this example, UE 102 is configured to support wireless connectivity with a public land mobile network (PLMN) associated with the operator core network 106 (which may be designated as the home PLMN for UE 102). UE 102 may therefore camp on a cell site of base station 104 and/or establish active connections to access the communications service offered by operator core network 106. Camping on a cell site generally refers to the practice of a UE maintaining a connection with a base station in idle mode for the purpose of potentially moving to an active mode to establish an active communication session with the cellular communications network. In some embodiments, each protocol data unit (PDU) session between a UE 102 and the operator core network 106 through base station 104 may be associated with a network slice and/or assigned a single-network slice selection assistance information (S-NSSAI) identifier that may be unique within the context of the PLMN.

The base station 104 periodically broadcasts to UE within its coverage area a Master Information Block (MIB) and at least a first System Information Block (SIB1). The UE 102 is preprogrammed to receive and process the MIB, which carries information that may be used by the UE 102 to receive and process the SIB1. The SIB1 carries information such as, but not limited to, a Cell identifier (Cell ID), a PLMN list (of PLMN accessible through the base station), cell (band layer) selection information, scheduling information (SI), and other codes, configurations, and information.

The cell selection information informs the UE 102 of the availability of cells 110, 112, and 114, and the particular frequency band (or frequencies), channel bandwidths, duplexing schemes, and/or other RF parameters of the band layers for each of the cells. The UE 102 may further receive initial SIB cell priority information from the base station 104 assigning a priority level to each of the cells. The UE 102 will attempt to establish an idle mode connection (e.g., camp) on the cell having the highest priority per the SIB cell priority.

As shown in FIG. 1, base station 104 includes small channel utilization manager (SCUM) 107. As explained in greater detail herein, the SCUM 107 operates in conjunction with other base station functions executed by the base station 104 to assign primary serving cells to UE 102 for carrier aggregation purposes, based on mitigating underutilization of small bandwidth channel layers since a cell used as secondary cell only is used sparingly as compared to a cell used as primary and secondary cell. Because the band layer of cell 110 is implemented as a small bandwidth channel layer, the user experience of a user of UE 102 may be degraded if that UE 102 is permitted to camp on cell 110 because of the limited channel bandwidth available from the band layer (particularly in the uplink direction). For example, if operating in TDD, the band layer of cell 110 may proportion its frame in the time domain to dedicate 70% for downlink transmissions and 20% for uplink transmissions (with a 10% guard between downlink and uplink transmissions). If the UE 102 is performing a function that generates substantial uplink transmissions (e.g., uploading a streaming video feed) and does not support uplink carrier aggregation, the limited uplink bandwidth available from cell 110 may result in lower data rates, dropped data packets, increased latency, and/or other conditions that result in a degraded user experience. If the UE 102 does support uplink carrier aggregation, then camping on the small bandwidth channel layer of cell 110 as a PCell does not risk degraded user experiences because the UE 102 can be allocated additional upstream bandwidth resources from another band layer (e.g., cell 112 and/or cell 114) functioning as a secondary serving cell to the primary serving cell.

Accordingly, in embodiments, during the registration process for a UE 102, the UE 102 is initially allocated a cell with a non-small bandwidth channel layer as its primary serving cell (e.g., cell 112 or cell 114) because the carrier aggregation capabilities of the UE 102 are not yet communicated to the SCUM 107. At this time, before the UE 102 is permitted to establish active sessions (e.g., voice calls and/or data transfers), the base station 104 needs to understand the capabilities of UE 102 so that uplink and downlink data channels between base station 104 and UE 102 can be configured accordingly. The base station 104 therefore sends the UE 102 a request message asking the UE 102 to report its capabilities, and the UE 102 responds accordingly with a capabilities report that includes an indication of its capabilities with respect to carrier aggregation. This capabilities report from the UE 102 is processed by the SCUM 107 to determine if the small bandwidth channel layer of cell 110 can be utilized as a primary serving cell by the UE 102 so that the UE 102 can be permitted to camp on cell 110.

In some embodiments, the capabilities report may indicate whether the UE 102 supports downlink carrier aggregation, and if so, which of the set of cells/band layers of base station 104 it is capable of using in the downlink direction for primary serving cells and/or secondary serving cells. Additionally, if the UE 102 further supports uplink carrier aggregation, the capabilities report may indicate a subset of the set of cells/band layers (of the downlink carrier aggregation set) that it is also capable of using for uplink carrier aggregation. If the SCUM 107 determines from the capabilities report that the UE 102 is unable (e.g., incapable) of using cell 112 and/or cell 114 as a secondary serving cell for uplink carrier aggregation, then it does not permit UE 102 to camp on band layer A. The SCUM 107 adjusts and/or maintains the SIB cell priorities of the UE 102 such that the UE 102 has a preference for camping on a band layer other than cell 110. In contrast, if the SCUM 107 determines from the capabilities report that the UE 102 is capable of using the band layers of cell 112 and/or 114 as secondary serving cells for uplink carrier aggregation, then it may reconfigure the SIB cell priorities of the UE 102 so that the UE 102 has a preference for camping on the band layer of cell 110. In some embodiments, the SCUM 107 may weigh additional factors in determining whether to configure UE 102 to be able to camp on the small bandwidth channel layer of cell 110. For example, as explained in more detail with respect to FIG. 2, the effective range and/or physical location of UE 102 with respect to the base station 104 may factor into whether UE 102 is permitted by the SCUM 107 to camp on the small bandwidth channel layer.

In some embodiments, the SCUM 107 may use other information provided by the UE 102 to determine if the small bandwidth channel layer can be utilized as a primary serving cell by the UE 102. In some embodiments, the UE 102 may provide a model number or other identification information that the SCUM 107 may use to look up the carrier aggregation capabilities of the UE 102. For example, the UE 102 may provide SCUM 107 with identification information that the SCUM 107 can use to query a database and/or server that stores information about the model of the UE 102, such as, but not limited to, carrier aggregation capabilities, including what frequency bands the UE 102 supports for downlink and/or uplink carrier aggregation. In some embodiments, such a database may be accessible from a remote service 109 via data network 108, for example.

Figure 1A:
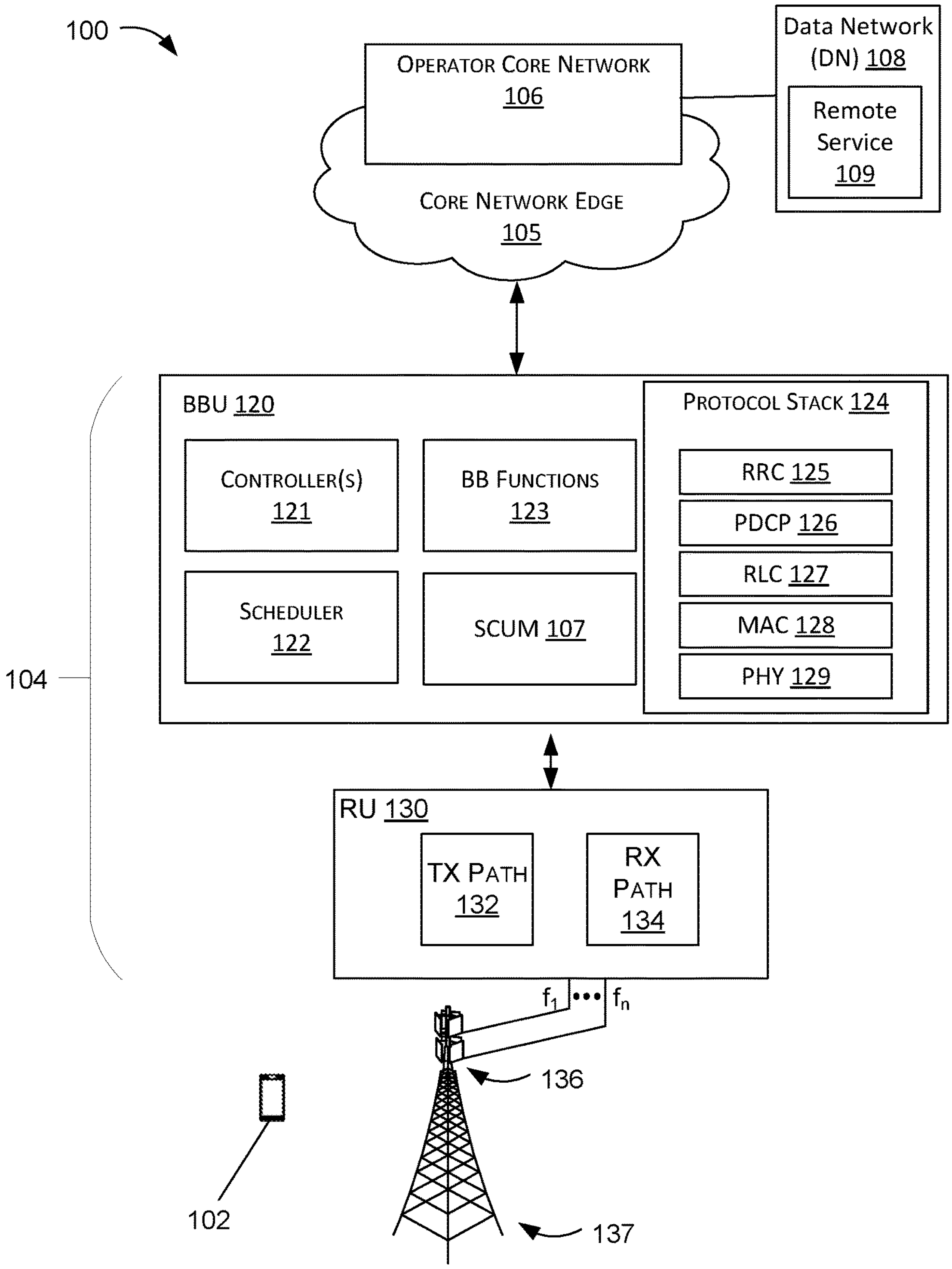
FIG. 1A is a diagram illustrating an example base station, in accordance with some embodiments described herein.

Referring now to FIG. 1A, FIG. 1A illustrates a base station 104 comprising a baseband unit (BBU) 120 coupled to at least one Radio Unit (RU) 130 through which the base station 104 serves a coverage area that comprises a plurality of cells such as cells 110, 112, and 114, as shown in FIG. 1. The BBU 120 comprises the circuitry and functionality to implement an air interface and Open System Interconnection (OSI) Layer 1, Layer 2, and Layer 3 functions for the air interface for base station 104.

The RU 130 includes a radio head comprising at least one transmit (TX) path 132 that includes radio transmitter circuitry (such as digital-to-analog converters, one or more RF filters, frequency upconverters, and/or a Power Amplifier (PA)). The RU 130 comprises at least one receive path (RX) 134 that includes radio receiver circuitry (such as analog-to-digital converters, one or more RF filters, frequency downconverters, and/or a Low-Noise Amplifier (LNA)). The TX path 132 and RX path 134 may be coupled to the antenna(s) 136 by one or more appropriate couplers (such as a duplexer, for example). In some embodiments, radio transmitter/receivers and antenna components of the RU 130 may include separate components connected via jumpers, or may be integrated together into a single integrated transmitting antenna (e.g. a massive MIMO device). The antenna(s) 136 may be physically mounted to a site tower 137 or other structure (such as a building, for example). Downlink RF signals are radiated into the coverage area of base station 104 via TX path 132 and antenna(s) 136 for reception by the UEs 102. Uplink RF signals transmitted by the UEs 102 are received via the antenna(s) 136 and RX path 134. The base station 104 may communicate with the UE 102 using an air interface that supports Single-Input Single-Output (SISO), or Multiple-Input Multiple-Output (MIMO), Single-Input Multiple-Output (SIMO), Multiple-Input Single-Output (MISO), or other beamforming technologies. In some embodiments, the base station 104 may optionally support multiple air interfaces and/or multiple wireless operators.

The network environment 100 and base station 104 are generally configured for wirelessly connecting UE 102 to data or services that may be accessible on one or more application servers or other functions, nodes, or servers (such as remote services 109 provided by servers of a data network (DN) 120, for example). In some implementations, the remote services 109 serve as the originating server or servers for operating data (such as environmental data, traffic condition data, navigation, and/or other operating commands) delivered to the UE 102 and/or utilized for operation of the UE 102. It should be understood that in some aspects, the network environment 100 shown in FIGS. 1 and 1A may implement one or more features of the operator core network 106 within other portions of the network, or may not implement them at all, depending on various carrier preferences.

The BBU 120 may comprise one or more controllers 121 comprising one or more processing units coupled to a non-transitory memory and programmed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 is responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink (UL) and downlink (DL) frames. An RB is the smallest unit of resource in a communication frame that can be allocated to a UE. In some embodiments, one RB is 1 slot long in time, and in frequency comprises a plurality of subcarriers, each having a frequency width determined by the applicable air interface standard. For example, for 5G NR, one RB may contain 12 consecutive subcarriers in the frequency domain, while the bandwidth of an RB may vary as a function of subcarrier spacing (SCS), which may also be referred to as numerology. In some embodiments the bandwidth of a 5G channel may comprise the maximum transmission bandwidth provided by a block of RBs with a guard band positioned on each side of the RBs. RBs of the channel allocated for providing service to a UE 102 are dynamically allocated by the scheduler 122 and referred to as active RBs. Using carrier aggregation, the scheduler 122 can allocate to a UE 102 RBs of a band layer of the UE's PCell, and augment those resources to support traffic when greater bandwidth is needed by allocating to the UE 102 additional RBs from the band layer of the UE's SCell. The data carrier within each RB is referred to as a resource element (RE), which comprises 1 subcarrier×1 symbol, and transports a single complex value representing data for a channel. Functions performed by the scheduler 122 include, but are not limited to: Packet Scheduling (arbitration of access to air interface resources between active UEs), resource allocation (allocation of air interface resources, such as resource blocks, to UE), modulation and coding scheme (MCS) which determines the level of protection of the data blocks sent over the air interface and power allocations (adjusting transmit power to achieve desired data rates and signal-to-interference noise ratio (SINR) levels).

Uplink and downlink communications traffic between the BBU 120 and UE 102 are processed through a protocol stack 124 implemented by the BBU 120 that comprises various protocol stack layers. In the example embodiment illustrated in FIG. 1A, the protocol stack 124 includes a radio resource control (RRC) layer 125, packet data convergence protocol (PDCP) layer 126, radio link control (RLC) layer 127, medium access control (MAC) layer 128, and physical layer (PHY) 129. In some embodiments, the implementation of uplink and/or downlink carrier aggregation is performed at least in part by the RRC layer 125 and MAC layer 128.

The MAC layer 128 is responsible, for example, for mapping between logical channels of the RLC layer 127 and transport channels of the PHY layer 129. MAC layer 128 may also perform functions such as, but not limited to, multiplexing of MAC service data units (SDUs) from logical channels onto transport blocks (TB) to be delivered to the PHY layer 129 on transport channels; demultiplexing of MAC SDUs from one or different logical channels from transport blocks (TB) delivered from the PHY layer 129 on transport channels; scheduling information reporting; error correction through hybrid automatic repeat requests (HARQ); priority handling between UEs by means of dynamic scheduling; priority handling between logical channels of one UE; and logical channel prioritization.

In some embodiments, MAC layer 128 manages multiplexing and demultiplexing of data across PCell and SCell carriers when carrier aggregation is activated. For example, MAC layer 128 distributes data from each logical channel across the primary and secondary component carriers of serving cells of a UE 102 identified to the MAC layer 128 (by the scheduler 122 or other BBU function that manages activation and deactivation of carrier aggregation, for example) as related for carrier aggregation purposes. Logical channels are multiplexed to form transport blocks for each component carrier. When carrier aggregation is activated, a primary component carrier is provided from the antenna(s) 136 to a primary serving cell, and one or more secondary component carriers are provided from the antenna(s) 136 for one or more secondary serving cells.

A discussed above, an initial PCell may be selected based on a cell search performed by the UE 102 (e.g., based on one or more SIB messages from the base station 104). The UE 102 would select an available cell from base station 104 based on SIB cell priority. Until the SCUM 107 receives a capabilities report from UE 102 that indicates the UE 102 has uplink carrier aggregation capabilities compatible with the band layer configuration of cell 110, the UE 102 will not be permitted to camp on cell 110. The SIB cell priority information used by the UE 102 will instead prioritize another cell of base station 104 for use as a PCell. When the SCUM 107 receives a capabilities report from the UE 102 that indicates the UE 102 has uplink carrier aggregation capabilities compatible with the base station's complement of cells, the SCUM 107 transmits an updated SIB cell priority list to the UE 102 that prioritizes the band layer of cell 110 with a higher priority, which adjusts UE 102 to prefer to select cell 110 as its PCell and camp on its small bandwidth channel layer.

In some embodiments, SCell coverage is added and activated or deactivated by MAC layer 128 in response to signaling from RRC layer 125. The PCell and SCell may be specifically related to each other by the RRC layer 125 for purposes of carrier aggregation based on the evaluation of carrier aggregation capabilities determined by the SCUM 107 of whether the UE 102 supports upstream carrier aggregation on the small bandwidth channel layer of cell 110. For example, activation and deactivation of secondary component carriers may be managed through MAC control elements sent from the RRC layer 125 to the MAC layer 128. In some embodiments, deactivation of secondary component carriers by the MAC layer 128 may be time-based. The SCUM 107 may work in conjunction with one or both of the RRC layer 125 and the MAC layer 128 to reconfigure the current serving cell relationship configuration of UE 102 based on the carrier aggregation capabilities indicated in the capabilities report and/or an effective range of the UE 102 from the base station 104. In some embodiments, the SCUM 107 may be a standalone function executed by the controller (s) 121 of BBU 120. In some embodiments, the functions of the SCUM 107 described herein may be incorporated into one or more of the other elements of the BBU, such as, but not limited to, the MAC layer 128 and/or the RRC layer 125, for example.

Figure 2:
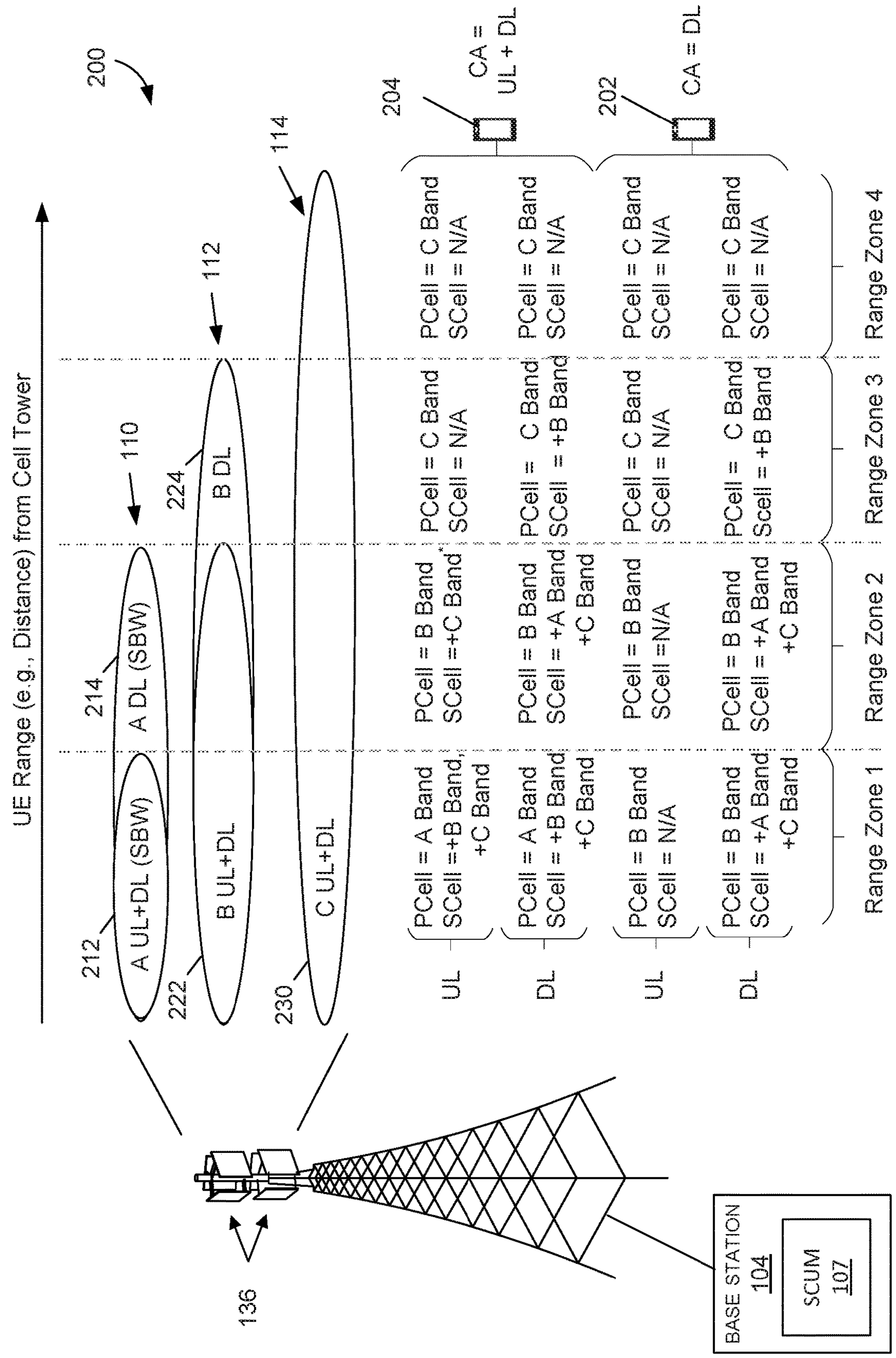
FIG. 2 is a diagram illustrating an example of primary serving cell to secondary serving cell configurations, in accordance with some embodiments described herein.

With reference to FIG. 2, FIG. 2 is a diagram illustrating at 200 an example of potential PCell to SCell relationships determined at least in part by the SCUM 107 based on the capabilities of a UE 102 and/or an effective range of the UE 102 from the base station 104. As shown in FIG. 2, base station 104 in this example operates three cells 110, 112, and 114, each providing different coverage areas.

Referring first to cell 110, this cell implements band layer A, which comprises a small bandwidth channel layer, as discussed, with respect to FIG. 1 and FIG. 1A. For a first effective range from base station 104, represented by range zone 1, a UE 102 can establish uplink and downlink connectivity from cell 110, as shown at 212. For a second effective range from base station 104, represented by range zone 2, a UE 102 can establish downlink connectivity from cell 110, as shown at 214, but the uplink signal strength transmitted by UE 102 may be unreliable and/or unable to establish uplink connectivity from cell 110.

Referring next to cell 112, this cell implements band layer B, which may comprise a non-small bandwidth, mid-band or high-band capacity channel layer. For a first effective range from base station 104, represented by range zone 1 plus range zone 2, a UE 102 can establish uplink and downlink connectivity from cell 112, as shown at 222. For a second effective range from base station 104, represented by range zone 3, a UE 102 can establish downlink connectivity from cell 112, as shown at 224, but the uplink signal strength transmitted by UE 102 may be unreliable and/or unable to establish uplink connectivity from cell 112.

Now referring to cell 114, this cell implements band layer C, which may comprise a low-band coverage channel layer, as shown at 230, from which a UE 102 can establish downlink and uplink connectivity for an extended distance from base station 104 through zones 1, 2, 3, and 4.

UE 202 in FIG. 2 represents a UE that is capable of downlink carrier aggregation, but not uplink carrier aggregation, using the cells 110, 112, and 114 provided by base station 104. When UE 202 connects with the base station 104 and the SCUM 107 processes the capabilities report received from UE 202, the SCUM 107 determines that UE 202 does not support uplink carrier aggregation and therefore UE 202 is not reconfigured to be able to camp on cell 110. Instead, in this example, UE 202 is directed to camp on cell 112 or 114. For example, when UE 202 is located in range zone 1 or range zone 2, it is able to establish uplink and downlink connectivity using cell 112 and 114. In this case, the UE 202 may be configured through SIB cell priorities to prefer camping on cell 112 because cell 112 may offer a higher capacity channel, and in order to ration the resources of cell 114 for UE farther from the base station that may not have access to cell 112. UE 202 does not support uplink carrier aggregation, but at least in zones 1 and 2, the UE 202 may be permitted to use cell 110 and/or cell 114 as an SCell for downlink carrier aggregation. When UE 202 is located in range zone 3, it is able to receive a downlink signal via cell 112, but is not close enough to base station 104 to transmit an uplink signal to base station 104. Accordingly, UE 202 is configured to establish a PCell for uplink and downlink connectivity using cell 114, and has the ability in the downlink direction to activate cell 112 as an SCell for downlink carrier aggregation. When UE 202 is located in range zone 4, access to base station 104 is limited to cell 114. The UE may be configured to establish a PCell for uplink and downlink connectivity using cell 114, but has no ability to activate downlink carrier aggregation.

UE 204 in FIG. 2 represents a UE that is capable of downlink carrier aggregation, and uplink carrier aggregation, using the cells 110, 112, and 114 provided by base station 104. When UE 204 connects with the base station 104 and the SCUM 107 processes the capabilities report received from UE 204, the SCUM 107 determines that UE 204 has support for uplink carrier aggregation and may reconfigure UE 204's SIB cell priority so that UE 204 will camp on cell 110. When UE 204 is located in range zone 1 it is able to establish uplink and downlink connectivity using any of the cells 110, 112, or 114. In this case, the UE 204 may be configured through SIB cell priorities to prefer camping on cell 110 to better utilize the available capacity of cell 110 as a PCell and correspondingly relieve traffic on cells 112 and/or 114. If UE 204 temporarily needs more bandwidth than available from the small bandwidth channel layer of cell 112, then the base station 104 may activate cell 112 and/or cell 114 as an SCell for uplink and/or downlink carrier aggregation. When UE 204 is located in range zone 2, it is able to receive a downlink signal via cell 110, but is not close enough to base station 104 to transmit an uplink signal to base station 104 via cell 110. Accordingly, UE 204 may be configured to establish a PCell for uplink and downlink connectivity using cell 112, and has the ability to activate cell 110 and/or cell 114 as an SCell for downlink carrier aggregation, and further may activate cell 114 for uplink carrier aggregation. In range zones 3, UE 204 is at a distance from base station 104 where cell 112 may only be available as an SCell for downlink carrier aggregation and is configured to establish a PCell for uplink and downlink connectivity using cell 114. When UE 204 is located in range zone 4, access to base station 104 is limited to cell 114. The UE may be configured to establish a PCell for uplink and downlink connectivity using cell 114, but has no ability to activate downlink carrier aggregation. It should be understood that in locations near the border between a zone and the next closest zone, signal propagation conditions may be dynamic so that a UE is able to operate for at least a finite duration of time, as if it were located in the closer range zone to the base station. The SCUM 107 may determine the effective range of a UE (and in which range zone it may reside) in various ways, and use that effective range information to adjust a UE's SIB cell priority list as discussed above. For example, in some embodiments, the SCUM 107 may receive position data from the UE (e.g., geolocation data such as position data from a global navigation satellite system (GNSS) such as the Global Positioning System (GPS)) and determine a distance between the UE and the base station from that position data. Based on that distance, the SCUM 107 or other function of the base station 104 can infer and/or compute an estimated effective range indicating where the UE is in relation to the uplink and/or downlink coverage areas of each of the cells. In some embodiments, the SCUM 107 or other function of the base station 104 can derive an effective distance (range) of a UE based on other data, such as signal quality measurements. For example, the UE may return to the base station a downlink signal strength measurement (or other signal measurement), and from that an estimate of a distance between the UE and the base station can be determined. In some embodiments, the SCUM 107 incorporates an effective range estimate for a UE together with the information provided by a capabilities report for that UE to determine whether and/or how to update the SIB cell priorities for that UE. Example signal quality measurements may include, but are not limited to, Reference Signal Received Power (RSRP) measurements that indicate an average power of Resource Elements (REs) that carry Reference Signals (RSs) across the bandwidth, and Reference Signal Received Quality (RSRQ) measurements that indicate a signal quality of RS received by UE. Other network statistics may also be considered as signal quality measurements.

Figure 3:
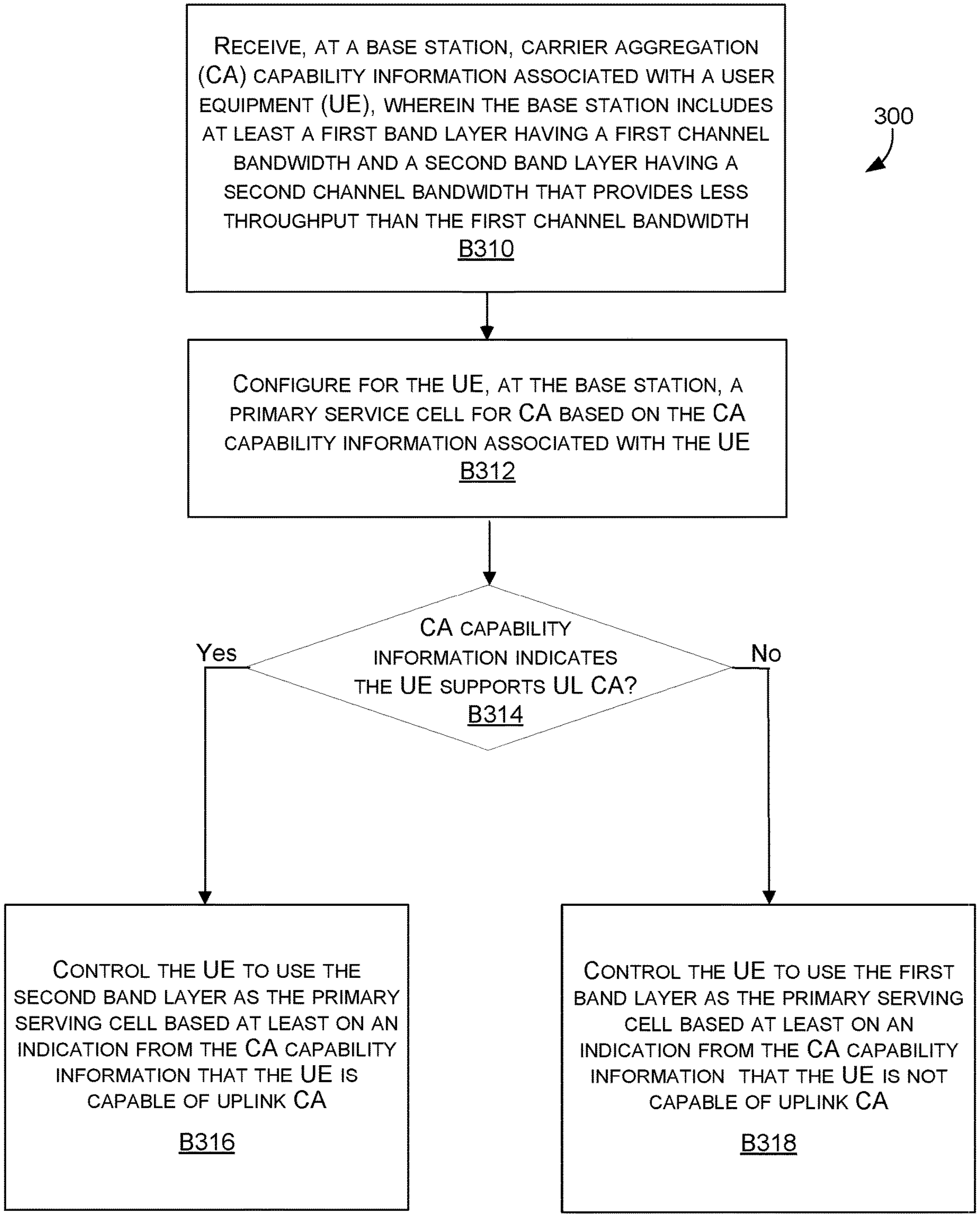
FIG. 3 is a flow chart illustrating a method for dynamically managing carrier aggregation configuration according to an embodiment.

FIG. 3 is a flow chart illustrating a method 300 for carrier aggregation-based base station band resource management, according to embodiments of the present disclosure. It should be understood that the features and elements described herein with respect to the method of FIG. 3 may be used in conjunction with, in combination with, or substituted for elements of any of the other embodiments discussed herein and vice versa. Further, it should be understood that the functions, structures, and other descriptions of elements for embodiments described in FIG. 3 may apply to like or similarly named or described elements across any of the figures and/or embodiments described herein and vice versa. In some embodiments, elements of method 300 are implemented utilizing a SCUM 107 executing on a base station BBU or on a separate network node or server, as discussed herein.

Method 300, at B310, includes receiving, at a base station, carrier aggregation capability information associated with a user equipment (UE), wherein the base station includes at least a first band layer having a first channel bandwidth and a second band layer having a second channel bandwidth that provides less throughput than the first channel bandwidth. The second band layer may comprise a small bandwidth channel layer that comprises, for example, a frequency-division duplex (FDD) band layer having a channel bandwidth of 5 MHz or less, or a time-division duplex (TDD) band layer having a channel bandwidth of 60 MHz or less. The method may include transmitting a capabilities request to UE and, in response, receiving the capabilities report from the UE that includes the carrier aggregation capability information.

Method 300, at B312, includes configuring for the UE, at the base station, a primary serving cell for carrier aggregation based on the carrier aggregation capability information associated with the UE. In some embodiments, the SCUM processes the carrier aggregation capability information and controls one or both of the MAC layer and the RRC layer to reconfigure a current primary serving cell to secondary serving cell relationship configuration associated with the UE based on the carrier aggregation capabilities indicated in the capabilities report and effective range of the UE from the base station.

Method 300, at B314, includes determining when the carrier aggregation capability information indicates that the UE supports uplink carrier aggregation. The base station may receive a capabilities report indicating a UE's ability to implement downlink and/or uplink carrier aggregation, as well as indicating which frequency bands the UE is capable of using for downlink and/or uplink carrier aggregation. Based on that configuration report, a small channel utilization manager may determine whether the UE can be reconfigured to use an available small bandwidth channel layer as its PCell and camp on that layer, thus increasing the utilization of that small bandwidth channel layer.

Method 300, at B316, includes controlling the UE to use the second band layer as the primary serving cell based at least on an indication from the carrier aggregation capability information that the UE is capable of uplink carrier aggregation. Method 300, at B318, includes controlling the UE to use the first band layer as the primary serving cell based at least on an indication from the carrier aggregation capability information that the UE is not capable of uplink carrier aggregation. In some embodiments, the method may include controlling the UE to configure to use the second band layer as the primary serving cell based at least on updating at the UE a cell priority information associated with the second band layer. In some embodiments, the method may include controlling the UE to configure to use the second band layer as the primary serving cell further based at least on an effective range of the UE from the base station. The effective range may be determined based on position data received from the UE and/or based on a signal quality measurement received from the UE. As discussed herein, the effective range of a UE from the base station may represent an additional factor in determining if the UE may be reconfigured to use the small bandwidth channel layer as a PCell. Because of the power resources available to a base station relative to those of a UE, downlink signals transmitted from a base station tend to propagate farther than uplink signals transmitted from a UE. In addition to distance, the effective range of a UE from the base station may also be influenced by other factors that contribute to signal attenuation, such as building walls, tunnels, terrain (e.g., flat terrain versus rolling hills), and/or natural foliage (e.g., trees) between the UE and the base station. As such, the small channel utilization manager may determine whether the UE is located sufficiently close in range to the base station to have sufficient signal strength to transport both uplink and downlink traffic on the small bandwidth channel layer. If it is, then the small channel utilization manager may proceed with reconfiguring the UE to use the small bandwidth channel layer as a PCell. If the UE is not located sufficiently close in range to the base station to have sufficient signal strength to transport both uplink and downlink traffic on the small bandwidth channel layer, then the configuration of the UE may be maintained such that it does not use the small bandwidth channel layer as a PCell.

In some embodiments, small channel utilization manager (SCUM) may be executed that is in communication with at least one of the MAC layer and the RRC layer of the base station. The SCUM may work in conjunction with one or both of the RRC layer and the MAC layer to reconfigure the current serving cell relationship configuration of UE based on the carrier aggregation capabilities indicated in the capabilities report and/or an effective range of the UE from the base station. In some embodiments, the SCUM may be executed on a node of the telecommunications network distinct from the base station. In some embodiments, execution of the functions of the SCUM described herein may be distributed between one or more nodes of the telecommunications network and/or the base station.

Figure 4:
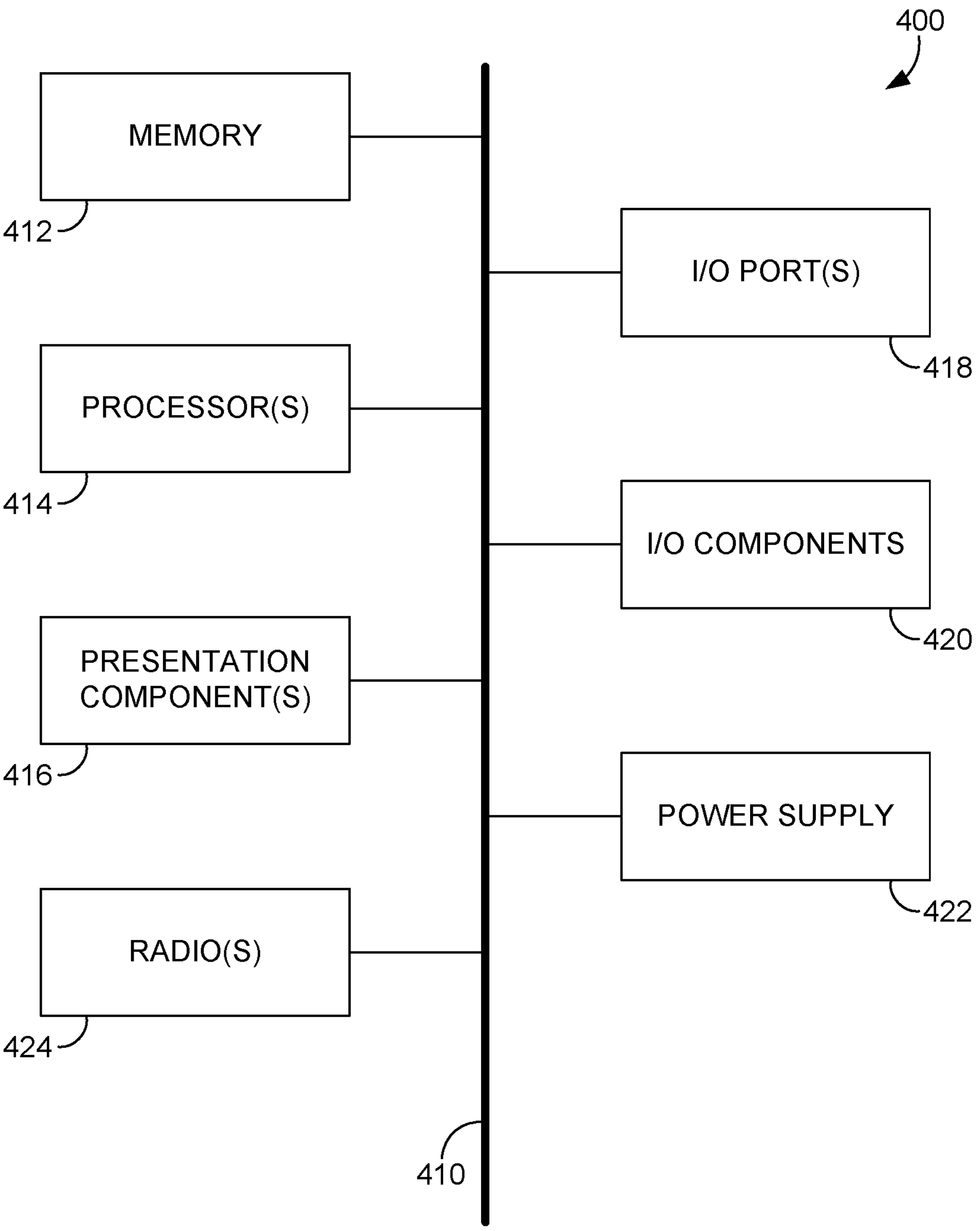
FIG. 4 is a diagram illustrating an example computing environment according to an embodiment.

Referring to FIG. 4, a diagram is depicted of an exemplary computing environment suitable for use in implementations of the present disclosure. In particular, the exemplary computer environment is shown and designated generally as computing device 400. Computing device 400 is but one example of a suitable computing environment and is not intended to suggest any limitation as to the scope of use or functionality of the embodiments described herein, and nor should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 410 that directly or indirectly couples the following devices: memory 412, one or more processors 414, one or more presentation components 416, input/output (I/O) ports 418, I/O components 420, power supply 422, and radio 424. Bus 410 represents what may be one or more buses (such as an address bus, data bus, or combination thereof). The devices of FIG. 4 are shown with lines for the sake of clarity. However, it should be understood that the functions performed by one or more components of the computing device 400 may be combined or distributed amongst the various components. For example, a presentation component such as a display device may be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 4 and refer to “computer” or “computing device.” In some embodiments, the BBU 120 may be implemented at least in part using computing device 400. In some embodiments, the small channel utilization manager (SCUM) as described in any of the examples of this disclosure may be implemented at least in part by code executed by the one or more processors(s) 414. In some embodiments, the one or more processors(s) 414 correspond to the one or more controllers 121 that execute the various functions of the BBU 120.

Computing device 400 typically includes a variety of computer-readable media. Computer-readable media can be any available non-transitory media that can be accessed by computing device 400 and includes both volatile and non-volatile media, removable and non-removable media. By way of example, and not limitation, computer-readable media may comprise non-transitory computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 412 includes computer-storage media in the form of volatile and/or non-volatile memory. Memory 412 may be removable, non-removable, or a combination thereof. Exemplary memory includes solid-state memory, hard drives, optical-disc drives, etc. Computing device 400 includes one or more processors 414 that read data from various entities such as bus 410, memory 412 or I/O components 420. One or more presentation components 416 may present data indications to a person or other device. Exemplary one or more presentation components 416 include a display device, speaker, printing component, vibrating component, etc. I/O ports 418 allow computing device 400 to be logically coupled to other devices, including I/O components 420, some of which may be built into computing device 400. Illustrative I/O components 420 include a microphone, joystick, game pad, satellite dish, scanner, printer, wireless device, etc.

Radio(s) 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications, including Wi-Fi, WiMAX, LTE, or other VOIP communications. As can be appreciated, in various embodiments, radio(s) 624 can be configured to support multiple technologies, and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments. In some embodiments, the TX path 132 and/or RX path 134 of RU 130 are implemented at least in part using radio(s) 424.

Figure 5:
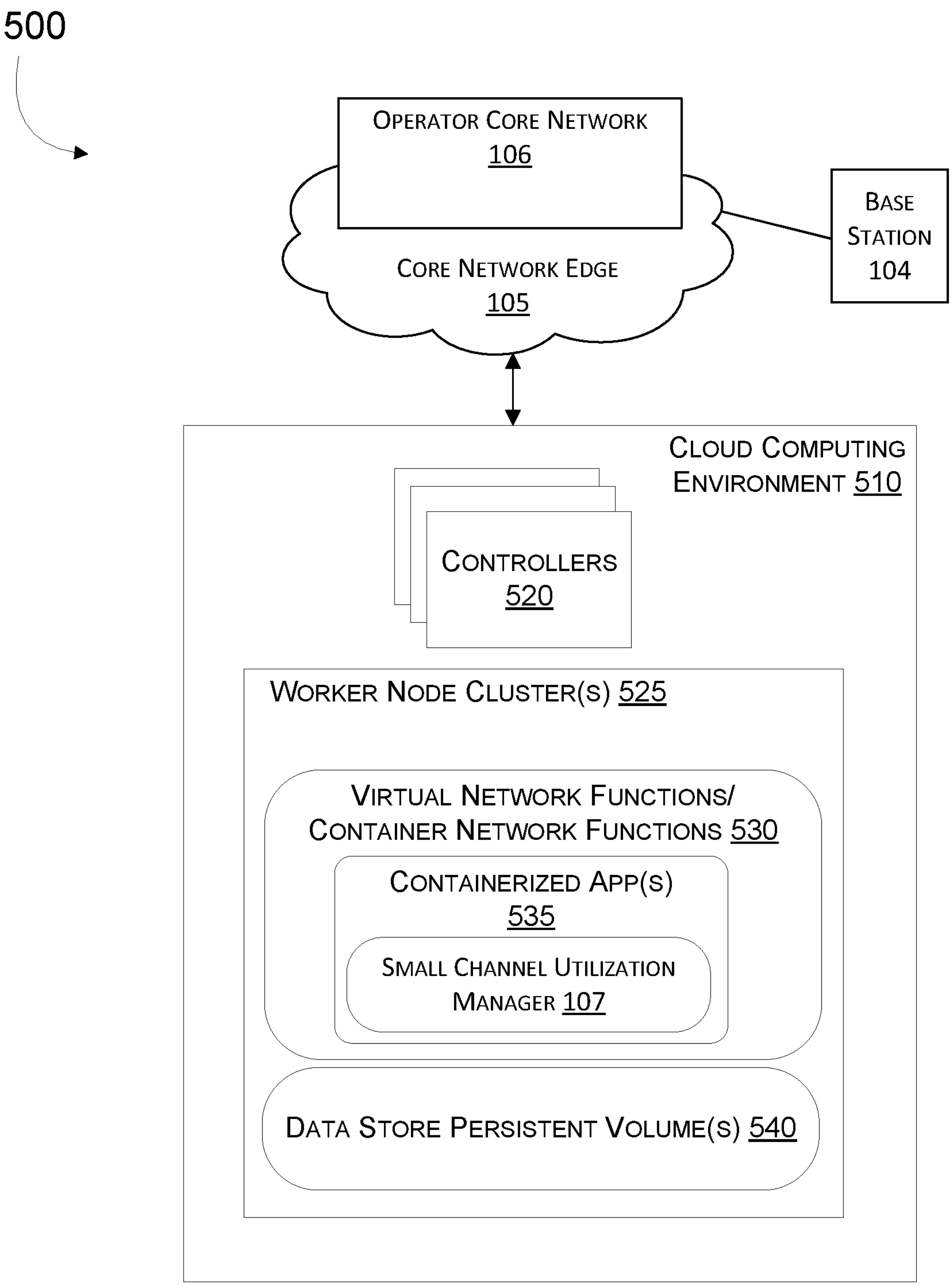
FIG. 5 is a diagram illustrating an example cloud computing environment according to an embodiment.

Referring to FIG. 5, a diagram is depicted generally at 500 of an exemplary cloud computing environment 510 for implementing one or more aspects of carrier aggregation spectrum management logic (SCUM), as described in any of the examples of this disclosure. Cloud computing environment 510 is but one example of a suitable cloud computing environment and is not intended to suggest any limitation as to the scope of use or functionality of the embodiments presented herein, and nor should cloud computing environment 510 be interpreted as having any dependency or requirement relating to any one or combination of components illustrated. In some embodiments, the cloud computing environment 510 is executed within the edge network 105, or otherwise coupled to the base station 104 and/or operator core network 106.

Cloud computing environment 510 includes one or more controllers 520 comprising one or more processors and memory. The cloud computing environment 510 may include one or more data store persistent volumes 540. The controllers 520 may comprise servers of one or more data centers. In some embodiments, the controllers 520 are programmed to execute code to implement at least one or more aspects of SCUM 107. For example, in one embodiment the SCUM 107 may be implemented, at least in part, as one or more virtual network functions (VNFs)/container network functions (CNFs) 530 running on a worker node cluster 525 established by the controllers 520.

Some data used by the SCUM 107 may be stored using the one or more data store persistent volumes 540. The cluster of worker nodes 525 may include one or more orchestrated Kubernetes (K8s) pods that realize one or more containerized applications 535 for SCUM 107 or other functions of a base station. In other embodiments, another orchestration system may be used to realize the SCUM 107. For example, the worker nodes 525 may use lightweight Kubernetes (K3s) pods, Docker Swarm instances, and/or other orchestration tools. In some embodiments, one or more elements of the base station 104, and/or other elements of the network environment 100, may be coupled to the controllers 520 of the cloud computing environment 510.

In various alternative embodiments, system and/or device elements, method steps, or example implementations described throughout this disclosure (such as the base station, baseband unit (BBU), radio unit (RU), scheduler, SCUM, or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer-executable instructions executed by computer system processors and hardware description languages such as Very High Speed Integrated Circuit (VHSIC) Hardware Description Language (VHDL).

As used herein, terms such as base station, radio access network, network operator core, user equipment (UE), baseband unit (BBU), radio unit (RU), scheduler, SCUM function, network node, server, and other terms derived from these words refer to the names of elements that would be understood by one skilled in the art of wireless telecommunications and related industries as conveying structural elements, and are not used herein as nonce words or nonce terms for the purpose of invoking 35 U.S.C. 112 (f). The terms "function," "unit," "node," "logic," and "module" may also be used to describe computer processing components and/or one or more computer-executable services being executed on one or more computer processing components.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof, wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for carrier aggregation-based band resource management, the system comprising:

one or more processors; and one or more computer-readable media storing computer-usable instructions that, when executed by the one or more processors, cause the one or more processors to:

receive, at a base station comprising a small channel utilization manager, carrier aggregation capability information associated with a user equipment (UE), wherein the base station includes at least a first band layer having a first channel with a first channel bandwidth and a second band layer having a second channel with a second channel bandwidth, wherein the second channel provides less throughput than the first channel;

using the small channel utilization manager:

process the carrier aggregation capability information to determine when the carrier aggregation capability information indicates that the UE supports uplink carrier aggregation using the first band layer and the second band layer; and based on the second channel bandwidth providing less throughput than the first channel bandwidth and the determination that the UE supports uplink carrier aggregation using the first band layer and the second band layer, configure for the UE, at the base station, the second band layer as a primary serving cell for carrier aggregation; and control the UE to use the second band layer as the primary serving cell.

2. The system of claim 1, the one or more processors further to:

control the UE to configure to use the second band layer as the primary serving cell based at least on updating, at the UE, cell priority information associated with the second band layer.

3. The system of claim 1, the one or more processors further to:

control the UE to configure to use the second band layer as the primary serving cell further based at least on an effective range of the UE from the base station.

4. The system of claim 3, the one or more processors further to:

determine the effective range of the UE from the base station based on position data received from the UE.

5. The system of claim 3, the one or more processors further to:

determine the effective range of the UE from the base station based on a signal quality measurement received from the UE.

6. The system of claim 1, the one or more processors further to:

transmit a capabilities request to UE; and receive a capabilities report from the UE that includes the carrier aggregation capability information.

7. The system of claim 1, wherein the one or more processors execute:

a base station protocol stack comprising at least a base station Media Access Control (MAC) layer and a radio resource control (RRC) layer; and wherein the small channel utilization manager (SCUM) is in communication with at least one of the MAC layer and the RRC layer, wherein an aggregation-based spectrum management logic processes the carrier aggregation capability information and controls one or both of the MAC layer and the RRC layer to reconfigure a current primary serving cell to secondary serving cell relationship configuration associated with the UE based on the carrier aggregation capability information and an effective range of the UE from the base station.

8. The system of claim 1, wherein the base station is coupled to a telecommunications network comprising a network operator core; and wherein the small channel utilization manager is executed on a node of the telecommunications network distinct from the base station.

9. The system of claim 1, wherein the second band layer is a small bandwidth channel layer comprising either:

a frequency-division duplex (FDD) band layer having a channel bandwidth of 5 MHz or less; or a time-division duplex (TDD) band layer having a channel bandwidth of 60 MHz or less.

10. A method for carrier aggregation-based band resource management, the method comprising:

determining carrier aggregation capability information of a UE in communication with a base station, wherein the base station includes at least a first band layer having a first channel with a first bandwidth and a second band layer having a second channel with a second bandwidth that provides less throughput than the first channel;

processing the carrier aggregation capability information to determine when the carrier aggregation capability information indicates that the UE supports uplink carrier aggregation using the first band layer and the second band layer;

based on the second channel bandwidth providing less throughput than the first channel bandwidth and a determination that the UE supports uplink carrier aggregation using the first band layer and the second band layer, controlling the UE to use the second band layer as a primary serving cell for carrier aggregation; and controlling the UE to use the first band layer as the primary serving cell based at least on an indication from the carrier aggregation capability information that the UE is not capable of uplink carrier aggregation.

11. The method of claim 10, the method further comprising:

updating, at the UE, cell priority information associated with the second band layer to configure the UE to use the second band layer as the primary serving cell.

12. The method of claim 10, the method further comprising:

determining an effective range of the UE from the base station based on position data received from the UE, wherein the determination of when the UE supports uplink carrier aggregation is further based on the effective range.

13. The method of claim 10, the method further comprising:

determining an effective range of the UE from the base station based on a signal quality measurement received from the UE, wherein the determination of when the UE supports uplink carrier aggregation is further based on the effective range.

14. The method of claim 10, wherein the second band layer is a small bandwidth channel layer comprising either:

a frequency-division duplex (FDD) band layer having a channel bandwidth of 5 MHz or less; or a time-division duplex (TDD) band layer having a channel bandwidth of 60 MHz or less.

15. The method of claim 10, the method further comprising:

receiving, at the base station, the carrier aggregation capability information associated with the UE in response to transmitting a capabilities request to the UE using the first band layer.

16. A wireless communication base station system, the system comprising:

at least one controller comprising one or more processing units configured to execute one or more functions of a wireless communication base station, wherein the wireless communication base station is configured to communicate with one or more user equipment (UE) over one or both of uplink (UL) radio frequency (RF) signals and downlink (DL) RF signals, wherein the wireless communication base station includes at least a first band layer having a first channel with a first channel bandwidth and a second band layer having a second channel with a second channel bandwidth, wherein the second channel provides less throughput than the first channel bandwidth, the one or more functions including:

a base station protocol stack comprising at least a Media Access Control (MAC) layer and a radio resource control (RRC) layer configured to control carrier aggregation for the one or more UE using the first band layer and the second band layer; and a small channel utilization manager (SCUM) in communication with at least one of the MAC layer and the RRC layer, wherein the small channel utilization manager is configured to:

process carrier aggregation capability information associated with at least a first UE of the one or more UE to determine when the carrier aggregation capability information indicates that the first UE supports uplink carrier aggregation using the first band layer and the second band layer;

based on the second channel bandwidth providing less throughput than the first channel bandwidth and a determination that the UE supports uplink carrier aggregation using the first band layer and the second band layer, control the first UE to use the second band layer as a primary serving cell for carrier aggregation; and control the first UE to use the first band layer as the primary serving cell based at least on an indication from the carrier aggregation capability information that the first UE is not capable of uplink carrier aggregation.

17. The system of claim 16, wherein the second band layer is a small bandwidth channel layer comprising either:

a frequency-division duplex (FDD) band layer having a channel bandwidth of 5 MHz or less; or a time-division duplex (TDD) band layer having a channel bandwidth of 60 MHz or less.

18. The system of claim 16, wherein the small channel utilization manager further:

controls the UE to configure to use the second band layer as the primary serving cell further based at least on a determination of an effective range of the UE from the wireless communication base station.

19. The system of claim 16, wherein the small channel utilization manager further:

determines the carrier aggregation capability information based at least on a capabilities report from the first UE; or receives the carrier aggregation capability information based on a query to a database.

20. The system of claim 16, wherein the small channel utilization manager further:

controls the first UE to configure to use the second band layer as the primary serving cell based at least on updating, at the first UE, cell priority information associated with the second band layer.

* * * * *